(No Model.)

D. J. C. ARNOLD
BRICK TRUCK.

No. 316,322. Patented Apr. 21, 1885.

WITNESSES:
Gustave Dieterich
C. Sedgwick

INVENTOR:
D. J. C. Arnold
BY Munn & Co.
ATTORNEYS.

UNITED STATES PATENT OFFICE.

DANIEL J. C. ARNOLD, OF NEW LONDON, OHIO.

BRICK-TRUCK.

SPECIFICATION forming part of Letters Patent No. 316,322, dated April 21, 1885.

Application filed January 21, 1885. (No model.)

*To all whom it may concern:*

Be it known that I, DANIEL J. C. ARNOLD, of New London city, in the county of Huron and State of Ohio, have invented certain new and useful Improvements in Brick-Trucks, of which the following is a full, clear, and exact description.

This invention relates to trucks for carrying bricks as they are dumped from the molds onto pallets; and the invention consists in a pallet-truck having two or more shelves or series of racks arranged one above the other over the wheel-axle of the truck or springs arranged thereon, and disposed and constructed so that the load or pallets carrying the bricks is or are readily balanced, and other advantages, as hereinafter specified, are obtained.

Reference is to be had to the accompanying drawings, forming a part of this specification, in which similar letters of reference indicate corresponding parts in both the figures.

Figure 1:
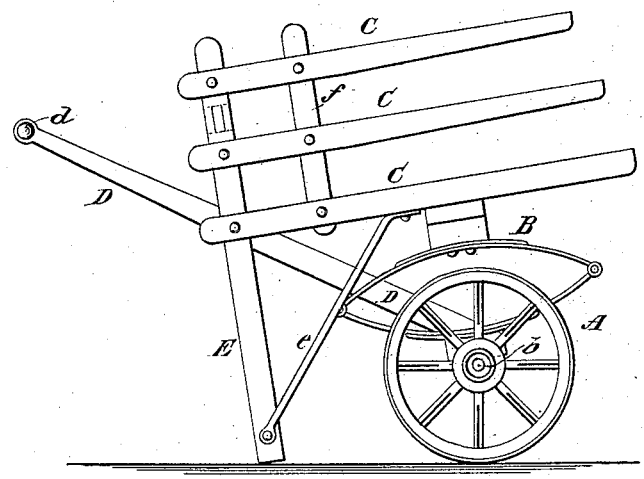
Figure 2:
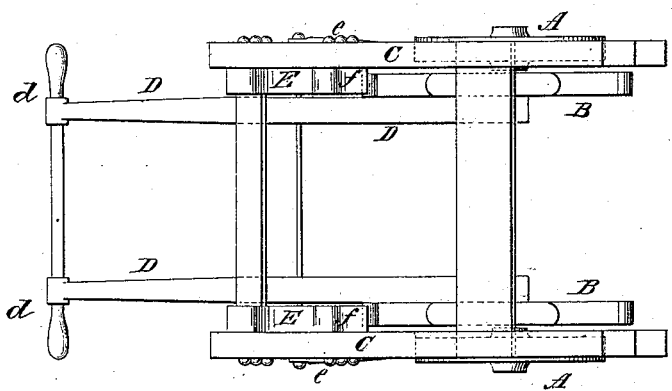

Figure 1 represents a side view of a brick-truck embodying my invention, and Fig. 2 a plan thereof.

A A are the running-wheels of the truck, and b their axle.

B B are springs arranged between the axle and the body of the truck to give an elastic support to the load and easy travel of the truck; but these springs may, if desired, be omitted.

The frame of the truck, which is of a skeleton construction, and includes rear side arms, D D, united by a cross handle or handles, d, back uprights, E, connected by cross-bars and oblique braces e e, or which may be of any other suitable construction, is composed in part or serves to carry a series of shelves or opposite side racks, C C, of which there may be two or more sets, arranged one above the other, that may be braced by rear side connecting-bars, f f, but which have open spaces between them. These shelves or racks are so arranged to project on opposite sides of the axle b, and over the same or over the supporting-spring B, as to balance the load, or nearly so.

Each rack may serve to carry two or more pallets having the bricks upon them, and by the open construction of the racks the truck is made more convenient to use, as the pallets may be placed upon them sidewise, and the truck as constructed requires but little room, and for a given capacity may be turned around in much less space than the ordinary brick-truck.

The truck is here shown as having duplicate carrying-wheels; but the invention is not restricted to any number of such wheels, as only one or two or more of said wheels may be used.

Having thus described my invention, I claim as new and desire to secure by Letters Patent—

1. In a truck, the combination, with the wheels A and axle b, of the spring B, mounted upon said axle, the open-sided shelves C C, the bottom ones of which are secured to a cross-piece fastened upon said springs, said shelves also being secured to uprights E f, the forward ones depending and forming legs, and the arms D, connected at their lower ends to said axle and at their upper rear ends to a handle, d, substantially as and for the purpose set forth.

2. In a brick-truck, the combination, with the wheel or wheels A and axle b, of the springs B, mounted on the axle, and the open-sided shelves or racks C C, arranged in sets of two or more, one above the other, and in balancing arrangement over the axle, substantially as shown and described.

DANIEL J. C. ARNOLD.

Witnesses:
A. M. BEATTIE,
E. W. EVANS.